May 15, 1923.
M. LOMBARDI
ASH PAN LIFTER
Filed May 20, 1922
1,455,216
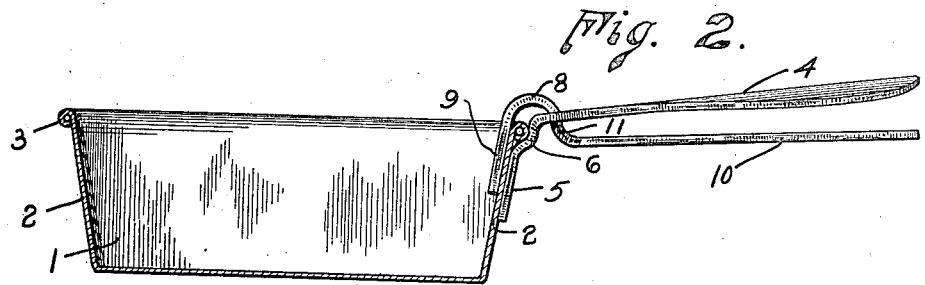
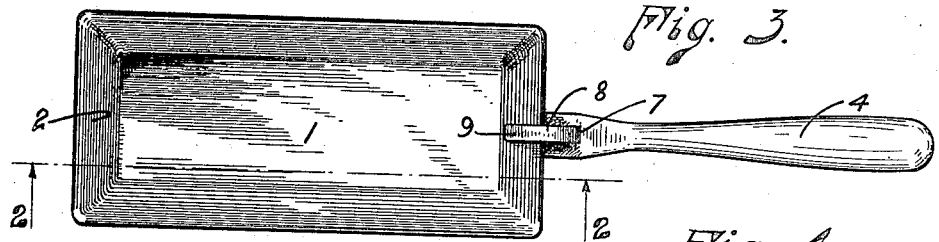
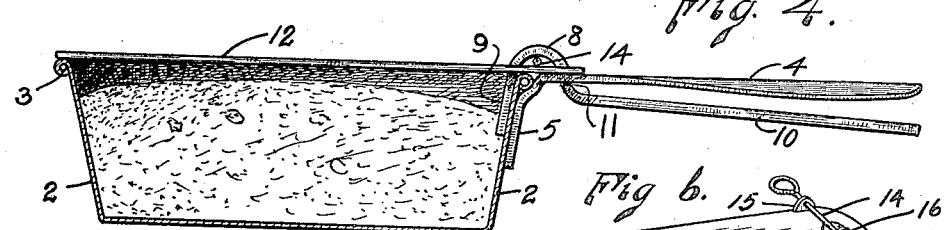
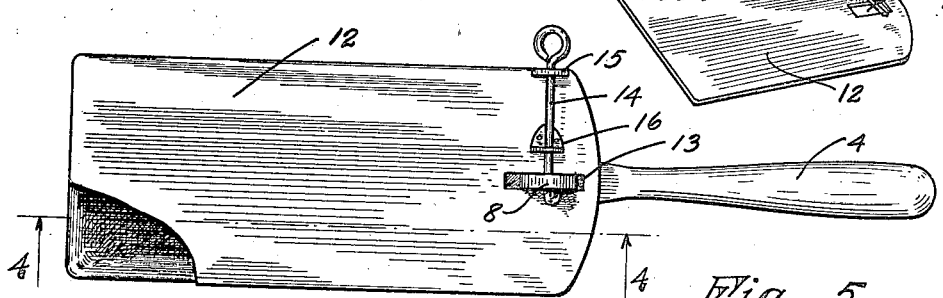
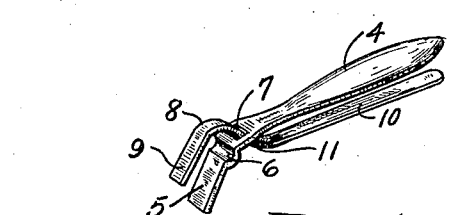
Inventor
Michael Lombardi.
By A. J. O'Brien
Attorney Patented May 15, 1923.

1,455,216

UNITED STATES PATENT OFFICE.

MICHAEL LOMBARDI, OF LOUISVILLE, COLORADO.

ASH-PAN LIFTER.

Application filed May 20, 1922. Serial No. 562,309.

*To all whom it may concern:*

Be it known that I, MICHAEL LOMBARDI, a citizen of the United States, residing at Louisville, county of Boulder and State of Colorado, have invented certain new and useful Improvements in Ash-Pan Lifters; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a tool that is especially designed for lifting hot pans, such as ash pans.

It is well known to those who employ stoves for heating or cooking that the removal of the ashes is a rather difficult and highly disagreeable task. Stoves are usually provided with ash pans which fit into a compartment under the grate and are intended to receive the ashes as they fall through the grate. As a result the ash pan is always hot, and unless the hands are well protected by heavy heat insulating gloves or mittens, they will be badly burned, and even when so protected the heat is often sufficient to burn the hands and damage the gloves and mittens employed. Even if the pan is successfully withdrawn and handled, the wind will blow the ashes about as soon as the pan is removed from the house to be emptied.

It is the object of this invention to provide a tool by means of which a hot ash pan can be readily grasped and handled regardless of its temperature, and which shall also be provided with means for covering the pan so as to prevent the ashes from being blown out.

The above objects are attained by means of a tool constructed in the manner which I shall now describe, reference being had for this purpose to the accompanying drawing in which—

Fig. 1 is a perspective view of my improved lifter;

Fig. 2 is a longitudinal section of an ash pan taken on line 2—2, Fig. 3, and shows my improved lifter in place thereon;

Fig. 3 is a plan view of the parts shown in Fig. 2;

Fig. 4 is a section, similar to that shown in Fig. 2, taken on line 4—4, Fig. 5, and shows my cover plate in place;

Fig. 5 is a plan view of the parts shown in Fig. 4; and

Fig. 6 is a perspective view of my cover plate.

The same reference numbers will be used to designate the same parts throughout the several figures.

Numeral 1 represents an ash pan which may be round or rectangular, provided with slanting sides 2, the upper edges of which are rolled about a reinforcing wire as indicated by numeral 3. My improved lifter is designed to grasp the side of the pan in the manner shown in Fig. 2, and consists of a handle member 4, the end 5 of which is downwardly bent to form a jaw member. Near the upper end of jaw 5 I provide a channel 6 which is adapted to receive the rolled edges 3. Member 4 is provided near the bend with a rectangular opening 7 through which the cooperating jaw member 8 extends; this member has a downwardly curved portion 9, whose function it is to engage the inner surface of the jaw edge and clamp the same against jaw 5. Formed integral with jaw member 8 is a handle 10 which is wider than member 8 and forms shoulders 11, which cooperate with the lower side of member 4 and form the fulcrum upon which the handle 10 and jaw member 8 pivot. The lifter is applied to the pan in the manner plainly shown in Figs. 2 and 4.

In order to prevent the wind from blowing the ashes out of the pan, I provide a cover 12 which is of the shape and size of the pan to be covered. This cover plate has a rectangular opening 13 near one end, which opening is adapted to fit over the upwardly bowed portion 8 of the jaw member. In order to hold the cover in place I provide a rod 14 which is slidably mounted in the upwardly extending ears 15 and 16. Cover plate 12 is placed on the lifter in such a manner that the part 8 extends through the opening 13, after which rod 14 is pushed through between the lower side of member 8 and the upper surface of the plate, as shown in Figs. 4 and 5. It will thus be held in place on the lifter, and when the latter is employed for lifting the pan, the cover will prevent the contents from being blown out.

From the above it will appear that I have provided a lifter that is well adapted for handling hot ash pans or the like, and which is also provided with a cover plate that prevents the contents from being blown out. My lifter is of simple yet substantial construction, and can be cheaply made.

Having now described my invention, what I claim is—

1. A pan lifter, comprising in combination, a handle member having one end bent at an angle thereto to provide a clamping jaw, a hole in said member near the bend therein, a second handle member having one end of diminished cross section and adapted to project through said opening, said end being curved upwardly and the terminal portion thereof bent downwardly so as to be substantially parallel with the jaw of said first mentioned handle member when the lifter is in operative position, and a pair of shoulders at the juncture of said last mentioned handle member and the portion of diminished cross section, said shoulders engaging the under surface of said first mentioned handle member and serving as a fulcrum.

2. A pan lifter, comprising in combination, a handle member having one end bent at an angle thereto to provide a clamping jaw, a hole in said member near the bend therein, a second handle member having one end of diminished cross section and adapted to project through said opening, said end being curved upwardly and the terminal portion thereof bent downwardly so as to be substantially parallel with the jaw of said first mentioned handle member when the lifter is in operative position, a pair of shoulders at the juncture of said last mentioned handle member and the portion of diminished cross section, said shoulders engaging the under surface of said first mentioned handle member and serving as a fulcrum, a cover plate, and means to secure said plate to the lifter.

3. A pan lifter, comprising in combination, a handle member having one end bent at an angle thereto to provide a clamping jaw, a hole in said member near the bend therein, a second handle member having one end of diminished cross section and adapted to project through said opening, said end being curved upwardly and the terminal portion thereof bent downwardly so as to be substantially parallel with the jaw of said first mentioned handle member when the lifter is in operative position, a pair of shoulders at the juncture of said last mentioned handle member and the portion of diminished cross section, said shoulders engaging the under surface of said first mentioned handle member and serving as a fulcrum, a cover plate, and means to secure said plate to the lifter, said means comprising a slidable rod adapted to engage the curved portion of the second mentioned jaw member.

In testimony whereof I affix my signature.

MICHAEL LOMBARDI.